US011198952B2

(12) United States Patent
Oechsle et al.

(10) Patent No.: US 11,198,952 B2
(45) Date of Patent: Dec. 14, 2021

(54) FILAMENT PRODUCTION DEVICE

(71) Applicant: Pall Corporation, Port Washington, NY (US)

(72) Inventors: Dietmar Oechsle, Schwäbisch Gmünd (DE); Christian Dahlberg, Bempflingen (DE); Erik Mueller, Benningen (DE); Werner Wietschorke, Stuttgart (DE); Steffen Key, Magstadt (DE)

(73) Assignee: PALL CORPORATION, Port Washington, NY (US)

( * ) Notice: Subject to any disclaimer, the term of this patent is extended or adjusted under 35 U.S.C. 154(b) by 406 days.

(21) Appl. No.: 16/046,180

(22) Filed: Jul. 26, 2018

(65) Prior Publication Data

US 2018/0327930 A1     Nov. 15, 2018

Related U.S. Application Data

(63) Continuation of application No. PCT/EP2017/053058, filed on Feb. 10, 2017.

(30) Foreign Application Priority Data

Feb. 12, 2016    (DE) .......................... 102016102494.5

(51) Int. Cl.
| | |
|---|---|
| *D01D 5/24* | (2006.01) |
| *B29C 48/10* | (2019.01) |
| *B29C 48/29* | (2019.01) |
| *B29C 48/285* | (2019.01) |
| *B29C 48/255* | (2019.01) |
| *B01D 69/08* | (2006.01) |

(Continued)

(52) U.S. Cl.
CPC .......... *D01D 5/24* (2013.01); *B01D 67/0006* (2013.01); *B01D 69/085* (2013.01);
(Continued)

(58) Field of Classification Search
None
See application file for complete search history.

(56) References Cited

U.S. PATENT DOCUMENTS

| | | | |
|---|---|---|---|
| 2004/0096655 A1 | 5/2004 | Schwind et al. | |
| 2007/0018361 A1* | 1/2007 | Xu .......................... | D01F 9/08 |
| | | | 264/465 |

(Continued)

FOREIGN PATENT DOCUMENTS

| | | |
|---|---|---|
| DE | 21 03 769 A1 | 9/1971 |
| DE | 100 22 889 A1 | 11/2001 |

(Continued)

OTHER PUBLICATIONS

International Bureau, International Search Report in International Application No. PCT/EP2017/053058, dated Apr. 21, 2017.

(Continued)

*Primary Examiner* — Timothy Kennedy
*Assistant Examiner* — Olukorede Esan
(74) *Attorney, Agent, or Firm* — Leydig Voit & Mayer, Ltd.

(57) ABSTRACT

A filament production device, in particular a filament reaction-spinning production device, comprising at least one spinning nozzle unit, which is provided for producing at least one filament formed as a hollow fibre membrane from at least one polymer solution, and comprising a polymerisation unit, which is provided for initiating a polymerisation of the polymer solution, wherein the polymerisation unit is provided for initiating the polymerisation at least partially within the spinning nozzle unit.

8 Claims, 10 Drawing Sheets

Figure 1:
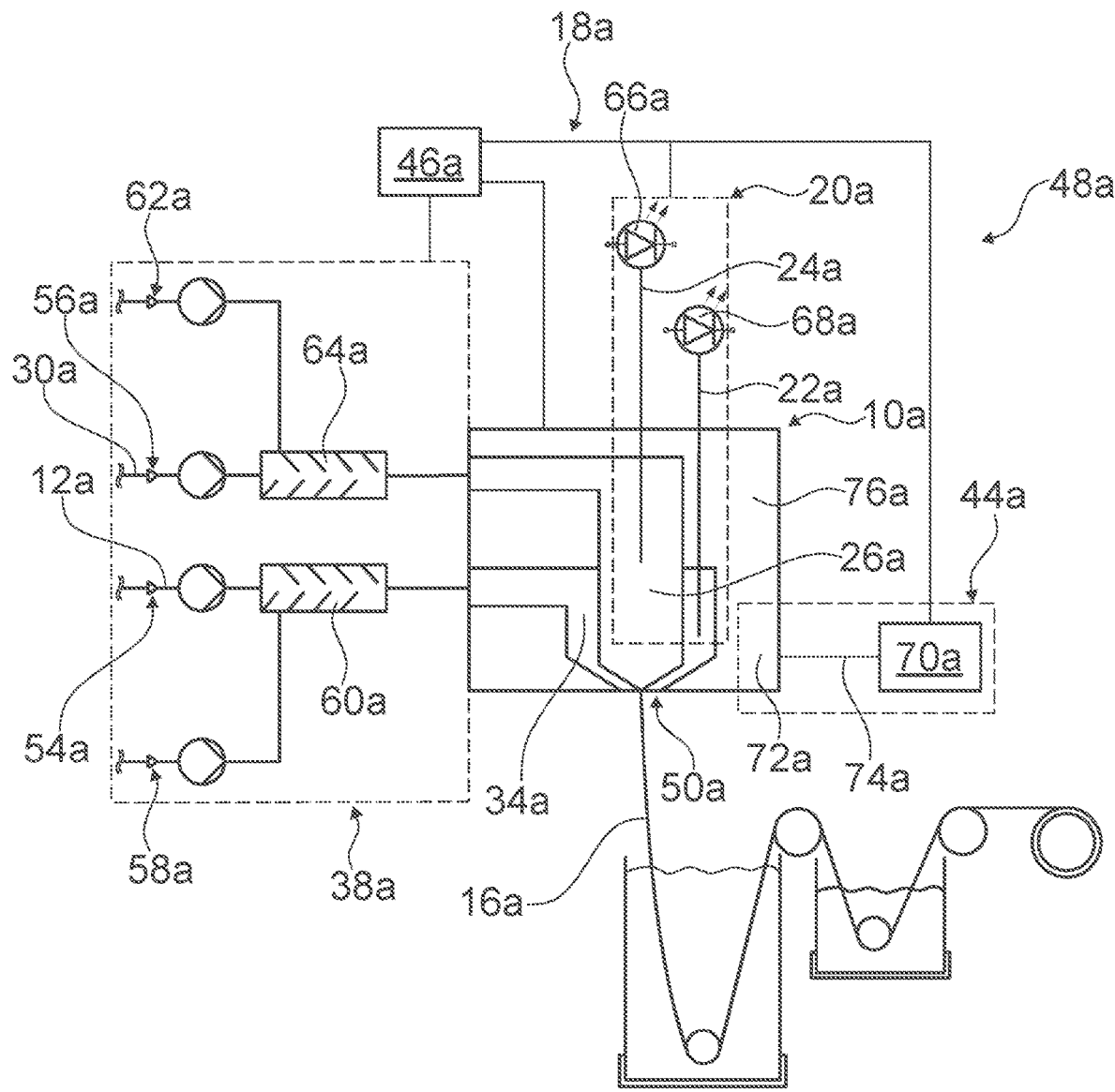

(51) Int. Cl.
    *B01D 67/00*     (2006.01)
    *D01D 10/00*     (2006.01)
    *D01D 5/38*     (2006.01)
    *B01D 71/34*     (2006.01)
    *B01D 71/68*     (2006.01)
    *B29K 27/00*     (2006.01)
    *B29K 81/00*     (2006.01)
    *B29L 31/00*     (2006.01)

(52) U.S. Cl.
    CPC .......... *B01D 69/087* (2013.01); *B01D 71/34* (2013.01); *B01D 71/68* (2013.01); *B29C 48/10* (2019.02); *B29C 48/2556* (2019.02); *B29C 48/29* (2019.02); *B29C 48/297* (2019.02); *D01D 5/38* (2013.01); *D01D 10/00* (2013.01); *B01D 2323/34* (2013.01); *B01D 2323/42* (2013.01); *B29K 2027/16* (2013.01); *B29K 2081/06* (2013.01); *B29L 2031/755* (2013.01); *D10B 2321/042* (2013.01); *D10B 2331/06* (2013.01); *D10B 2505/04* (2013.01)

(56) References Cited

U.S. PATENT DOCUMENTS

2011/0006453 A1* 1/2011 Ying ........................ D01D 5/38
                                                                                                 264/171.27
2015/0075027 A1 3/2015 Maehara et al.
2018/0290107 A1 10/2018 Oechsle

FOREIGN PATENT DOCUMENTS

| | | |
|---|---|---|
| FR | 2 682 969 A1 | 4/1993 |
| JP | S60-215808 A | 10/1985 |
| WO | 2005/026398 A2 | 3/2005 |
| WO | 2007/103098 A2 | 8/2007 |
| WO | 2008/103561 A1 | 8/2008 |
| WO | 2009/108138 A1 | 9/2009 |
| WO | 2010/040243 A1 | 4/2010 |
| WO | 2012/029412 A1 | 3/2012 |
| WO | 2013/137237 A1 | 9/2013 |
| WO | 2017/109194 A1 | 6/2017 |

OTHER PUBLICATIONS

Jeong, W., et al., "Hydrodynamic microfabrication via "on the fly" photopolymerization of microscale fibers and tubes," *Lab Chip*, 4: 576-580 (2004).

International Bureau, English translation of International Preliminary Report on Patentability in International Application No. PCT/EP2017/053058, dated Aug. 14, 2018.

European Patent Office, Office Action in European Patent Application No. 17 705 580.3, dated Jan. 7, 2020.

Japanese Patent Office, Office Action in Counterpart Japanese Patent Application No. 2018-542186, dated Oct. 27, 2020.

* cited by examiner

FILAMENT PRODUCTION DEVICE

CROSS-REFERENCE TO RELATED APPLICATIONS

This patent application is a Continuation of International Patent Application No. PCT/EP2017/053058, filed Feb. 10, 2017, which claims the benefit of German Patent Application No. 10 2016 102 494.5, filed Feb. 12, 2016, which are each incorporated by reference.

BACKGROUND OF THE INVENTION

A filament production device which has at least one spinning nozzle unit and which is provided for producing at least one filament from at least one polymer solution, and which comprises a polymerisation unit which is provided for initiating a polymerisation of the polymer solution is already known.

SUMMARY OF THE INVENTION

The invention relates to a filament production device and a production method with a filament production device.

The object of the invention lies in particular in providing a device of the type in question that has improved properties in respect of its efficiency. The object is achieved in accordance with the invention by the features of the independent claims, whereas advantageous embodiments and developments of the invention can be found in the dependent claims.

The invention proceeds from a filament production device, in particular a filament reaction-spinning production device, comprising at least one, preferably exactly one, spinning nozzle unit, which is provided for producing at least one filament from at least one polymer solution and in particular from at least one further polymer solution, preferably by means of at least one inner fluid and particularly preferably by means of at least one further inner fluid, advantageously in series production, and comprising one, preferably exactly one, polymerisation unit, which is provided for initiating a polymerisation of the polymer solution and in particular of the further polymer solution, preferably by means of the inner fluid, and particularly preferably by means of the further inner fluid.

It is proposed that the polymerisation unit is provided for initiating the polymerisation at least partially within the spinning nozzle unit. The filament can hereby be hydrophilically functionalised by the polymerisation as it is being formed, whereby process times in series production can be reduced. Higher proportions of the polymers contained in the polymer solution can be cross-linked, thus saving material costs. In particular, individual properties of the filament, such as the functionalisation and advantageously the morphology of the filament, can be adjusted selectively, whereby in particular the roughness depth of the filament can be increased and therefore a flow rate can be improved. On the whole, the efficiency, in particular cost efficiency, preferably time efficiency and/or material efficiency, of the production process and also in particular the product efficiency can be improved.

A "filament production device" is understood to mean in particular a filament reaction-spinning production device, in particular a production device which is provided at least for the production of a filament, in particular by means of reaction spinning, wherein the filament is provided in particular for microfiltration, preferably ultrafiltration, and particularly preferably nanofiltration. The term "provided" is to be understood in particular to mean specifically programmed, designed and/or equipped. The fact that an object is provided for a specific function is to be understood in particular to mean that the object performs and/or carries out this specific function in at least one application state and/or operating state. The filament production device can be provided in particular for wet spinning of the filament, preferably by phase inversion.

The expression "reaction spinning" is to be understood in particular to mean a method for producing filaments in which the polymer solution is spun during a polymerisation of the polymer solution. A "filament" is to be understood in particular to mean an elongate object, the longitudinal extent of which corresponds to a multiple of the diameter of the object, at least three times, preferably at least six times, and particularly preferably ten times the diameter of the object. The filament is provided in particular to absorb a liquid with a substance dissolved therein and to separate the substance from the liquid at least in part, in particular at least to a large extent, and particularly preferably entirely, wherein the filament advantageously absorbs the separated substance and allows the liquid to pass through. The filament in particular has a structure that is partially permeable for a liquid, in particular a porous structure, which preferably forms a membrane at least partially. The filament is in particular formed as a hollow fibre and preferably as a hollow fibre membrane. A "polymer solution" is to be understood in particular to mean a solution which comprises at least one polymer and in particular a further polymer, and at least one solvent for the at least one polymer and/or for the at least one further polymer. The polymer is provided in particular for forming the membrane of the filament. The further polymer is provided in particular for forming pores in the membrane of the filament. The further polymer is also provided for functionalising the filament hydrophilically by polymerisation. The polymer solution comprises, as polymer, in particular polysulfone (PSU), polyethersulfone (PES), polyvinylidene fluoride (PVDF), poly(arylene sulfone) (PAS) and/or poly(aryl ether sulfone) (PAES). As further polymer, the polymer solution comprises polyvinylpyrrolidone (PVP) in particular. The polymer solution can comprise in particular further chemical components, such as non-solvents, monomers, copolymers, pre-polymers, fillers, pigments, flame retardants and/or polymerisation initiators. The term "polymerise" is to be understood in particular to mean cross-linked and advantageously the creation of at least a plurality of node points and/or crossing points. The expression "initiate a polymerisation" is to be understood in particular to mean to start at least one chemical reaction which triggers a polymerisation at least indirectly and advantageously directly of at least one polymer of the polymer solution, of the polymer and/or of the further polymer. The expression "a polymerisation initiator" is to be understood in particular to mean a substance which is provided to start at least one chemical reaction which indirectly and preferably directly initiates the polymerisation of at least one polymer of the polymer solution, advantageously of the polymer and/or of the further polymer. The expression "an inner fluid" is to be understood in particular to mean a fluid which comprises at least one non-solvent for the polymer and/or the further polymer. In particular, the inner fluid can comprise further chemical components, such as solvents, monomers, copolymers, pre-polymers, fillers, pigments, flame retardants, pore generators and/or polymerisation initiators. The spinning nozzle unit in particular comprises at least one spinning nozzle and in particular a plurality of spinning nozzles, which is/are preferably provided for spinning the polymer solution. The polymerisation unit is in particular formed integrally with the spinning nozzle unit, at least partially and preferably at least to a large extent and particularly preferably entirely, and/or more advantageously is integrated therein at least partially, in particular to a large extent, and particularly preferably entirely. The expression "formed integrally at least partially" is to be understood in this context to mean in particular that at least one component of at least one object, in particular the object itself, is formed integrally with at least one component of at least one further object, in particular is formed integrally with the further object itself. The expression "formed integrally" is to be understood in this context to mean in particular at least connected with a substance-to-substance bond, for example by a welding process, an adhesive bonding process, an injection moulding process, and/or another process appearing expedient to a person skilled in the art. The expression "formed integrally" is also to be understood advantageously to mean in one part. The expression "in one part" is to be understood in particular to mean formed in one piece. This one piece is preferably produced from an individual blank, a mass and/or a casting, preferably in an injection moulding process, in particular a one-component and/or multi-component injection moulding process.

It is also proposed that the polymerisation unit comprises at least one irradiation unit, which is provided for applying electromagnetic radiation to at least the polymer solution and in particular the further polymer solution, the inner fluid and/or the further inner fluid, preferably within the spinning nozzle unit, in order to initiate the polymerisation. The irradiation unit is in particular connected at least to a radiation source and/or advantageously comprises a radiation source, which is provided preferably for generating the electromagnetic radiation. The electromagnetic radiation has in particular a radiation spectrum and in particular an intensity maximum of the radiation spectrum in the range of ultraviolet radiation (UV), in particular near UV radiation (UV-A), middle UV radiation (UV-B), far UV radiation (UV-C-FUV), vacuum UV radiation (UV-C-VUV) and/or extreme UV radiation (EUV). The electromagnetic radiation, in particular the radiation spectrum, and preferably the intensity maximum of the radiation spectrum advantageously has an energy in particular of at least 3.2 eV, advantageously at least 3.94 eV, more advantageously at least 4.43 eV, preferably at least 6.20 eV, and particularly preferably at least 10.25 eV, and/or in particular at most 124 eV, advantageously at most 12.4 eV, more advantageously at most 6.2 eV, preferably at most 4.43 eV, and particularly preferably at most 3.94 eV. The electromagnetic radiation, in particular the radiation spectrum, and preferably the intensity maximum of the radiation spectrum more advantageously has a wavelength of at most 390 nm, advantageously at most 315 nm, more advantageously at most 280 nm, preferably at most 200 nm, and particularly preferably at most 121 nm and/or in particular at least 10 nm, advantageously at least 100 nm, more advantageously at least 200 nm, preferably at least 280 nm, and particularly preferably at least 315 nm. The electromagnetic radiation, in particular at a position at which the electromagnetic radiation is coupled into the spinning nozzle unit and/or preferably at a position at which the electromagnetic radiation impinges on the polymer solution, the further polymer solution, the inner fluid and/or the further inner fluid, in particular has a power density in particular of at least 0.01 mW/cm$^2$, preferably at least 0.05 mW/cm$^2$, and particularly preferably at least 0.2 mW/cm$^2$ and/or in particular of at most 5 mW/cm$^2$, preferably at most 2 mW/cm$^2$, and particularly preferably at most 0.5 mW/cm$^2$. The radiation source can be formed in particular as a gas discharge lamp, in particular a halogen metal vapour lamp, preferably a mercury vapour lamp, as a laser, a light-emitting diode and/or as a laser diode. In particular, the irradiation unit is provided for varying, preferably over time, at least one property of the electromagnetic radiation of the irradiation unit, for example the radiation spectrum, in particular an intensity maximum of the radiation spectrum, and/or the power density of the electromagnetic radiation. The variation is in particular different from a switching on and/or off process. The irradiation unit, for varying at least one property of the electromagnetic radiation, advantageously comprises in particular at least one optical component, for example at least one optical frequency filter, which in particular can be formed as a high-pass filter, low-pass filter and/or bandpass filter, at least one lens, at least one beam splitter, at least one attenuator, at least one mirror, at least one prism and/or at least one optical modulator.

It is conceivable that the spinning nozzle unit is permeable at least partially for electromagnetic radiation in order to apply the electromagnetic radiation at least to the polymer solution, the further polymer solution, the inner fluid and/or the further inner fluid. The spinning nozzle unit for this purpose can have in particular components and/or openings that are partially transparent for the electromagnetic radiation. In order to achieve selective polymerisation, however, it is proposed that the irradiation unit comprises at least one radiation-guiding element, which is provided to couple the electromagnetic radiation at least partially into the spinning nozzle unit. The radiation-guiding element is provided in particular for optically transmitting the electromagnetic radiation. The radiation-guiding element is formed in particular as an optical waveguide and preferably as an optical fibre. The radiation-guiding element is arranged in particular on and/or in the spinning nozzle unit and is preferably connected to the spinning nozzle unit such that it can be detached without destruction and particularly preferably without tools.

The refractive index of the radiation-guiding element, or of an optical unit downstream of the radiation-guiding element, can be advantageously at least substantially identical to a refractive index of the inner fluid and/or a refractive index of the polymer solution. The fact that "a refractive index is substantially identical to a further refractive index" is to be understood in this context to mean in particular that the refractive indices differ from one another at most by 25%, preferably at most by 10%, preferably at most by 5%, and particularly preferably at most by 1%. In particular, a coupling of the electromagnetic radiation into the polymer solution and/or the inner fluid can be improved as a result.

The radiation-guiding element can also have a concave or convex tip in order to advantageously further improve the coupling-in of the electromagnetic radiation. Alternatively or additionally, an optical unit of the filament production device arranged downstream of the radiation-guiding element can also be conceivable in order to couple in the electromagnetic radiation.

In order to improve in particular the guidance of the electromagnetic radiation within the inner fluid, the inner fluid can have a refractive index that is greater, preferably significantly greater, than the refractive index of the polymer solution. The fact that "a refractive index is significantly greater than a further refractive index" is to be understood in this context to mean in particular that the refractive index is greater than the further refractive index by at least 1%, preferably by at least 5%, preferably by at least 15%, and particularly preferably by at least 25%. Total reflection at an interface between the polymer solution and inner fluid can advantageously be attained as a result, and therefore the inner fluid and the polymer solution form a liquid radiation-guiding element.

Alternatively, in order to improve the guidance of the radiation within the polymer solution, the polymer solution can have a refractive index that is greater, preferably significantly greater, than the refractive index of the inner fluid and preferably the refractive index of a surrounding environment. Total reflection can be attained hereby advantageously at an interface between the polymer solution and a surrounding environment, and therefore the inner fluid and the polymer solution form a liquid radiation-guiding element.

The radiation-guiding element can be arranged in particular at least partially within at least one spinning nozzle wall of the spinning nozzle unit. Furthermore, a main extent of the radiation-guiding element within the spinning nozzle unit can be at least substantially parallel and/or at least substantially perpendicular to a flow direction of the inner fluid and/or the polymer solution and/or to the main extent of the inner fluid channel and/or the polymer solution channel. The spinning nozzle wall in particular has a receiving channel for the radiation-guiding element. The spinning nozzle wall can preferably consist at least partially of a transparent material, for example a plastics material, and in particular at least partially of a reflective material, for example a metal, such that electromagnetic radiation which is coupled in by the liquid radiation-guiding element is reflected at an interface between the transparent and the reflective material in the direction of the polymer solution and/or the inner fluid. It is also conceivable that the liquid radiation-guiding element has an at least partially curved profile, in particular within the spinning nozzle wall, and is preferably curved in the direction of the polymer solution and/or in the direction of the inner fluid.

The radiation-guiding element can be provided in particular for coupling electromagnetic radiation into the fluid and/or into the polymer solution. A surface of the filament can advantageously be functionalised as the electromagnetic radiation is being coupled into the inner fluid. A structuring of the filament can also be improved advantageously by coupling the electromagnetic radiation into the polymer solution.

It is also proposed that the spinning nozzle unit has at least one inner fluid channel, which is provided for guiding an inner fluid, in particular the aforementioned inner fluid, and at least one polymer solution channel, which is provided for guiding the polymer solution, wherein the polymer solution channel surrounds the inner fluid channel in at least one cross-section, in particular in the peripheral direction, at least partially, preferably at least to a large extent, and particularly preferably entirely. The morphology of the filament can hereby be varied in a simple way and advantageously inexpensively.

It is conceivable that the spinning nozzle unit has at least one further polymer solution channel, which is provided for guiding the further polymer solution, and/or at least one further inner fluid channel, which is provided for guiding the further inner fluid. The polymer solution channels and/or the inner fluid channels can be arranged in particular in various combinations with one another, and advantageously surround one another in at least one cross-section, in particular in the peripheral direction, at least partially, preferably at least to a large extent, and particularly preferably entirely. In particular, the polymer solution channels can be provided advantageously for guiding the same polymer solution, and/or the inner fluid channels advantageously can be provided for guiding the same inner fluid. In order to attain a multi-layer morphology of the filament and in particular to improve the stability of the filament particularly inexpensively, it is proposed that the spinning nozzle unit has at least one further polymer solution channel, wherein the polymer solution channel and the further polymer solution channel are provided for guiding different polymer solutions. The expression "different polymer solutions" is to be understood to mean in particular polymer solutions which differ from one another at least by a chemical component, advantageously at least a polymer. The polymer solution in particular comprises at least one chemical component, in particular a polymer, which is absent in the further polymer solution, or vice versa. The further polymer solution preferably comprises polyvinylidene fluoride (PVDF), whereas the polymer solution is free from polyvinylidene fluoride (PVDF). The polymer solution also comprises polyethersulfone (PES), whereas the further polymer solution is free from polyethersulfone (PES). The spinning nozzle unit can also have at least one further inner fluid channel, wherein the inner fluid channel and the further inner fluid channel are provided for guiding different inner fluids. The expression "different inner fluids" is to be understood in particular to mean inner fluids which differ from one another at least by a chemical component, in particular a non-solvent.

In a preferred embodiment of the invention, it is proposed that the irradiation unit is provided for coupling the electromagnetic radiation at least partially into at least one channel, preferably the polymer solution channel, in particular into a plurality of channels, preferably into the polymer solution channel, the further polymer solution channel, the inner fluid channel and/or the further inner fluid channel of the spinning nozzle unit. The precision of the coupling-in the electromagnetic radiation can be further improved hereby. The irradiation unit in particular has at least one radiation-guiding element and in particular a plurality of radiation-guiding elements per channel. The radiation-guiding element is arranged on and/or in the channel. The radiation-guiding element is in particular fastened to the channel such that it can be detached without destruction and advantageously without tools. It is also conceivable that the radiation-guiding element is flange-mounted on the channel and/or particularly preferably is adhered into the channel.

The filament production device in particular has a temperature-control unit. The temperature-control unit is provided in particular for varying the temperature at least of the polymer solution, whereby in particular the viscosity of the polymer solution can be adjusted. It is also proposed that the polymerisation unit has a temperature-control unit, in particular the aforementioned temperature-control unit, which is provided for applying heat energy at least to the polymer solution, the further polymer solution, the inner fluid and/or the further inner fluid in order to initiate the polymerisation. An advantageously uniform initiation of the polymerisation can be provided as a result. The heat energy corresponds in particular to a temperature at least of the polymer solution, the further polymer solution, the inner fluid and/or the further inner fluid of at least −5° C., preferably at least 5° C., and particularly preferably at least 30° C., and/or in particular at most 200° C., preferably at most 150° C., and particularly preferably at most 100° C. The temperature-control unit can be formed in particular as a thermocryostat. The temperature-control unit preferably has at least one temperature-control element, which is provided for absorbing and releasing heat energy. The temperature-control element is formed in particular as a radiator. The temperature-control unit, in particular the temperature-control element, is formed at least partially integrally with the spinning nozzle unit. The temperature unit also has a heat energy source which is connected to the temperature-control element for exchange of heat energy. It is conceivable in particular that the heat energy source and the temperature-control element are formed integrally at least partially.

It is also proposed that the polymerisation unit comprises at least one feed unit, which is provided for feeding at least one polymerisation initiator, in particular indirectly and particularly preferably directly, to at least one channel, in particular at least a plurality of channels, preferably the polymer solution channel, the further polymer solution channel, the inner fluid channel and/or the further inner fluid channel, of the spinning nozzle unit. The polymerisation of the polymer solution can hereby be prevented from starting before the spinning nozzle. The feed unit has at least one feed line, in particular at least one feed line per channel of the spinning nozzle unit, for the polymerisation initiator. The polymerisation initiator can be in particular a radical starter, such as peroxide, tert-butyl peroxypivalate and/or H2O2/CuCl2. The polymerisation initiator can also be in particular a photoinitiator, such as 4,4,'-diazidostilbene 2,2'-disodium sulfonate. In particular, the electromagnetic radiation, preferably the radiation spectrum thereof, and particularly preferably the intensity maximum of the radiation spectrum, is selected such that it coincides with an absorption spectrum of the polymerisation initiator at least partially, in particular at least to a large extent, and particularly preferably entirely. For example, the absorption spectrum of 4,4,'-diazidostilbene 2,2'-disodium sulfonate lies in a spectral range of from 350 nm to 390 nm. In particular, a power density of the electromagnetic radiation is also selected so that it is sufficient at least for activation of the polymerisation initiator. For example, the power density for activation for 4,4,'-diazidostilbene 2,2'-disodium sulfonate lies in a power range of from $0.2$ mW/cm$^2$ to $0.5$ mW/cm$^2$. In particular, a heat energy, in particular a temperature, of the spinning nozzle unit and/or the polymer solution and in particular of the inner fluid is also selected so that it is sufficient at least for activation of the polymerisation initiator and advantageously corresponds to the decomposition temperature of the polymerisation initiator. For example, the heat energy for activation of peroxide lies in a temperature range of from 70° C. to 90° C.

In order to improve a variable production of the filament and in particular in order to enable an adjustment of the production parameters to external conditions, in particular so as to attain a uniform quality of the filament, it is proposed that the filament production device has a control unit which is provided for controlling the polymerisation unit for selective initiation of the polymerisation. A "control unit" is to be understood in particular to mean an electronic unit which preferably is provided for controlling at least the one operating parameter of the polymerisation unit by open-loop and/or closed-loop control. The control unit preferably comprises a computing unit and, in particular additionally to the computing unit, a memory unit with an open-loop and/or closed-loop control program stored therein, which is provided to be executed by the computing unit. The expression "an operating parameter" of the polymerisation unit is to be understood to mean in particular a property of the electromagnetic radiation, for example the radiation spectrum, the intensity, and in particular the course thereof over time, a property of the temperature-control unit, for example the heat energy, in particular temperature and advantageously course thereof over time, and/or a production property, such as a flow rate of the polymer solution, the further polymer solution, the inner fluid and/or the further inner fluid through the spinning nozzle unit and/or a substance amount ratio, in particular of the polymer of the polymer solution and of the polymerisation initiator.

The invention also proceeds from a production method, in particular reaction-spinning production method, with a filament production device which has a spinning nozzle unit, wherein at least one filament is produced by means of the spinning nozzle unit from at least one polymer solution, wherein polymerisation is initiated at least partially within the spinning nozzle unit. The efficiency, in particular cost efficiency, preferably time efficiency and/or material efficiency of the production process, and in particular the product efficiency can be improved as a result.

BRIEF DESCRIPTION OF THE SEVERAL VIEWS OF THE DRAWING(S)

Further advantages will become clear from the following description of the drawings. The drawings show three exemplary embodiments of the invention. The drawings, the description, and the claims contain numerous features in combination. A person skilled in the art will expediently also consider the features individually and combine them to form further useful combinations.

Figure 2:
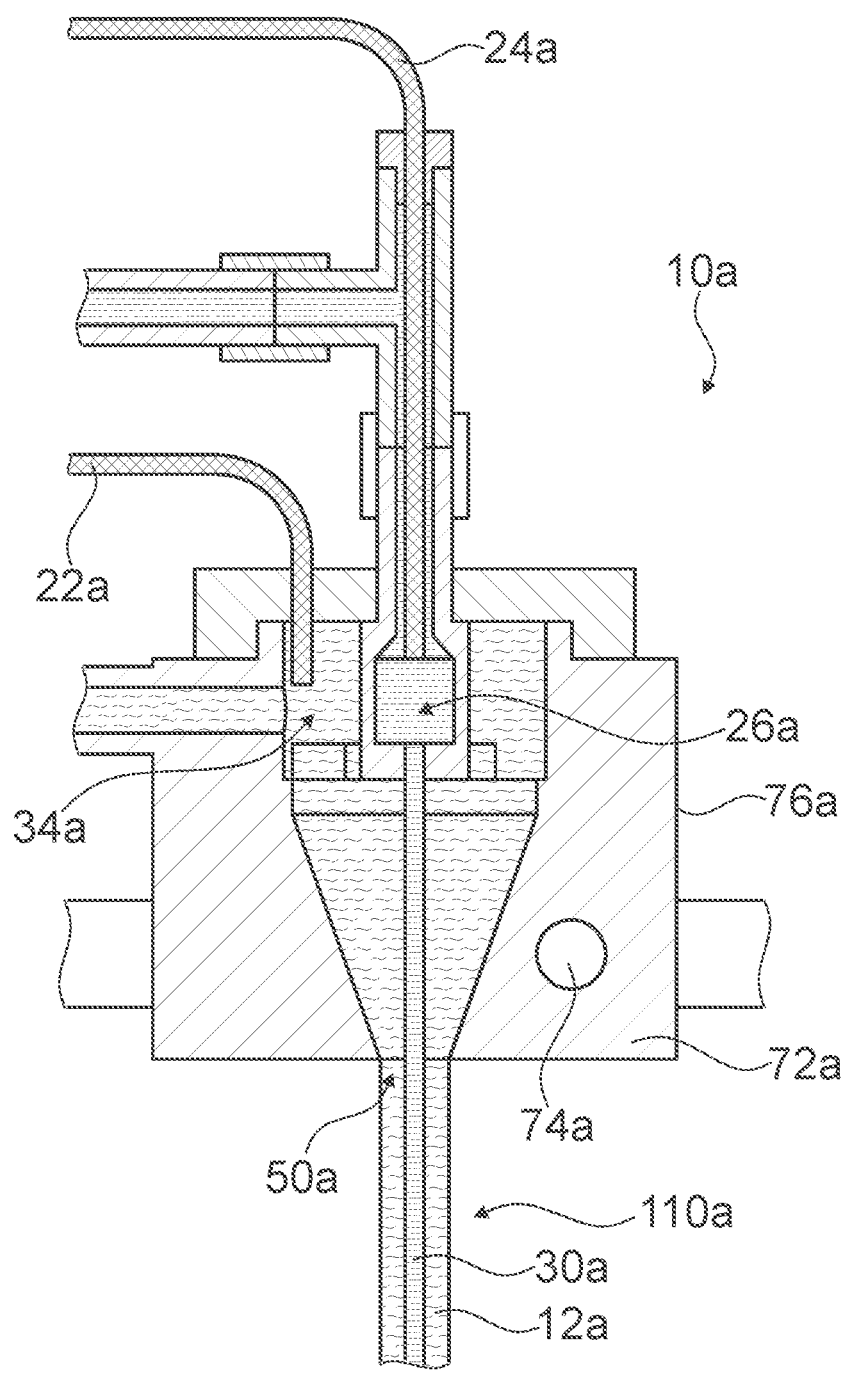
Figure 3:
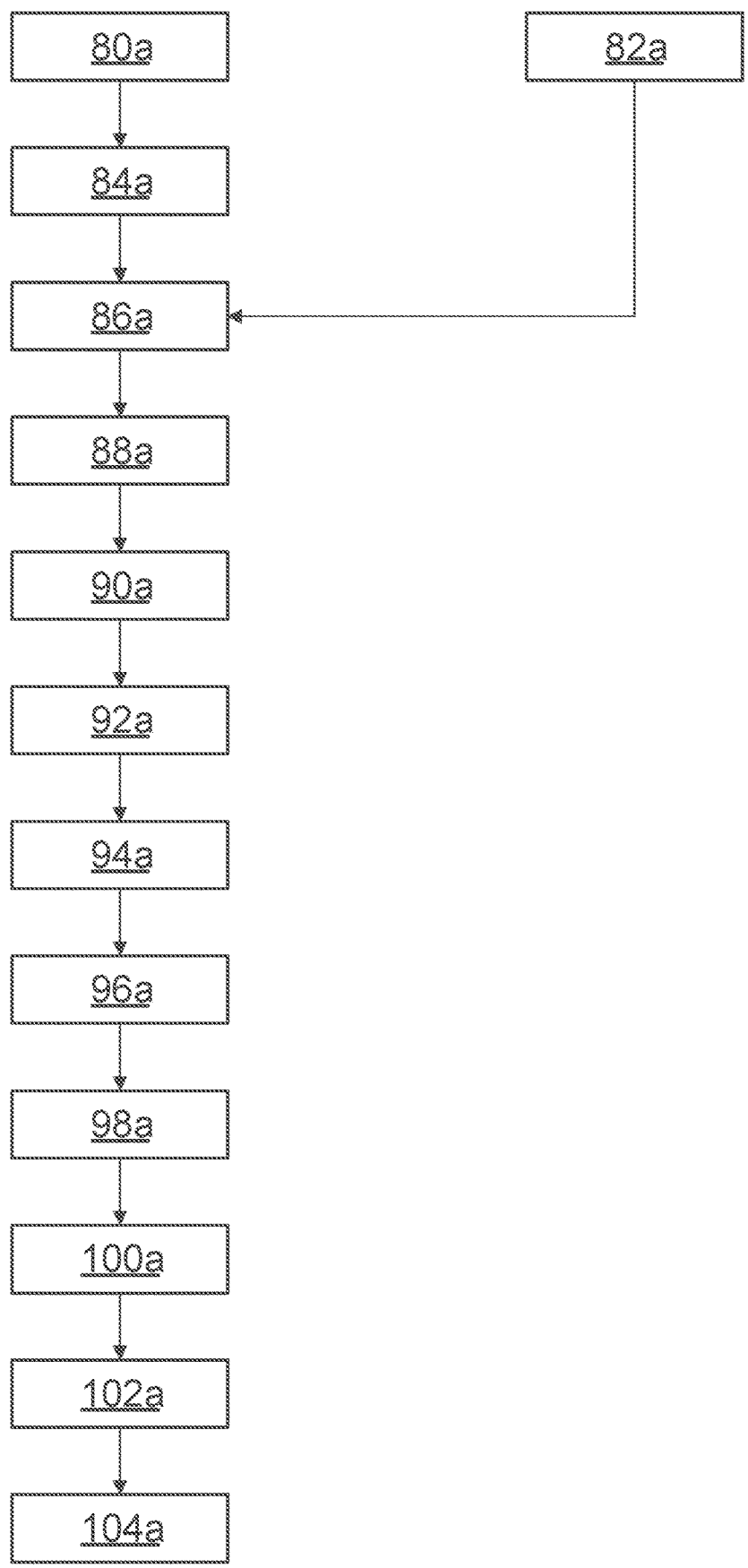
Figure 4:
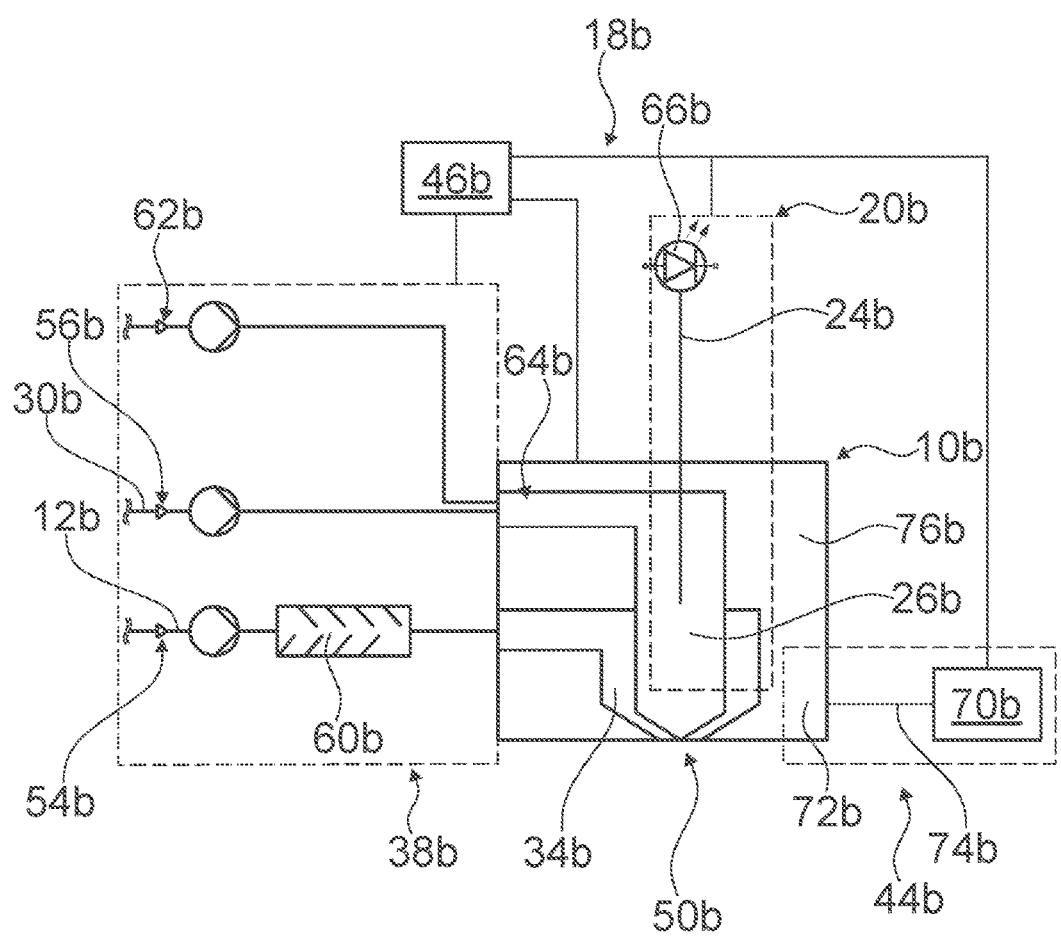
Figure 5:
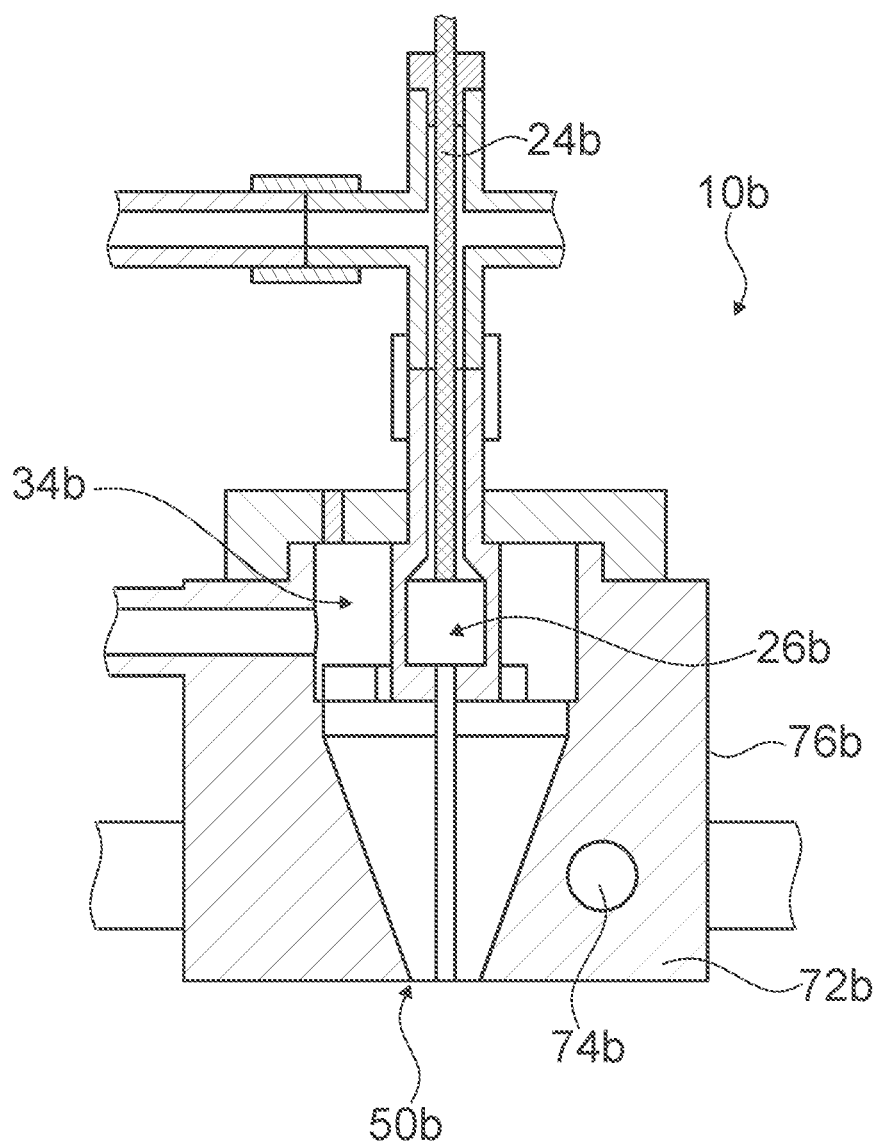
Figure 6:
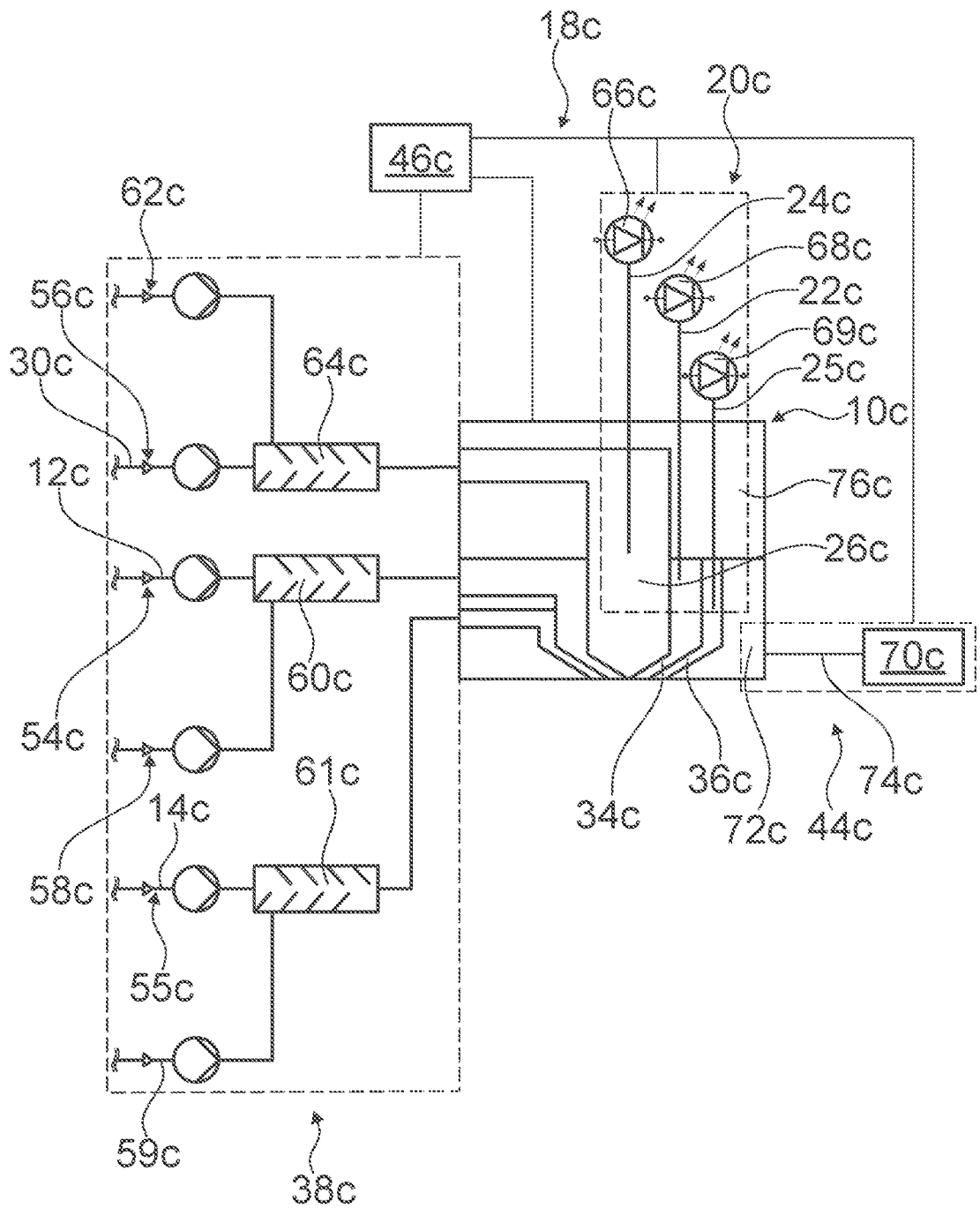
Figure 7:
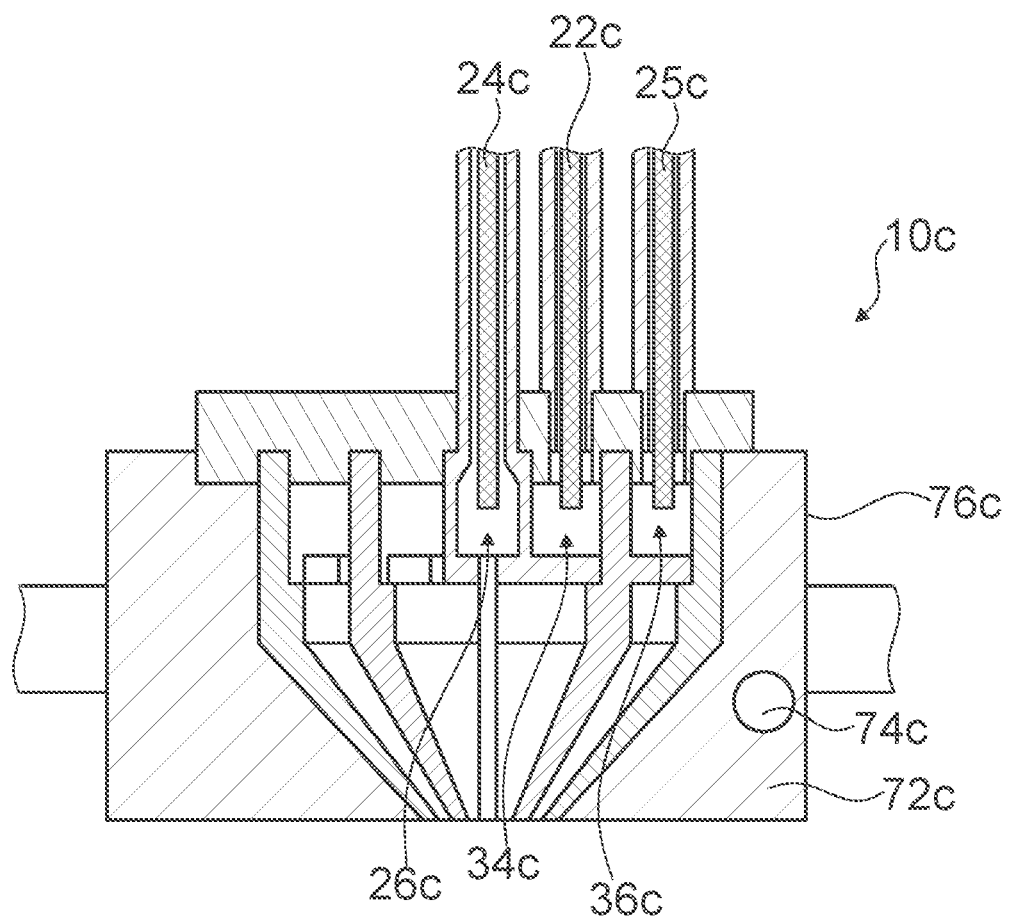
Figure 8:
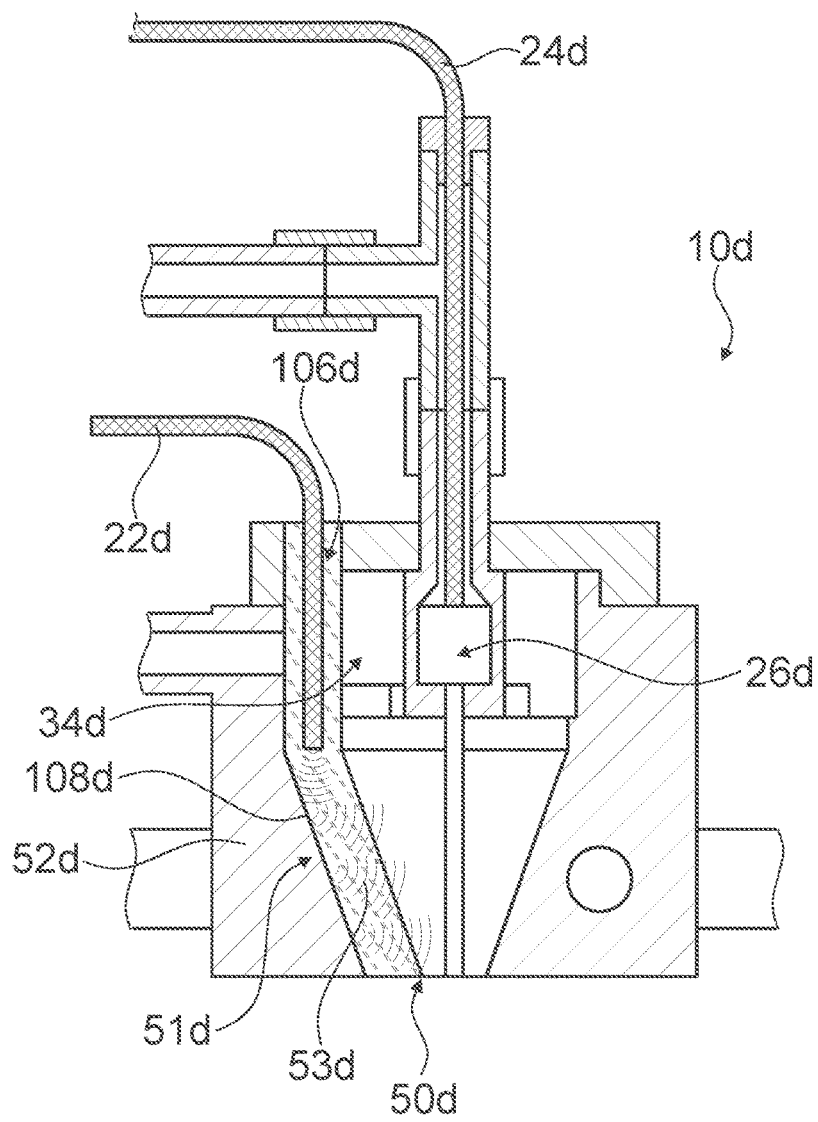
Figure 9:
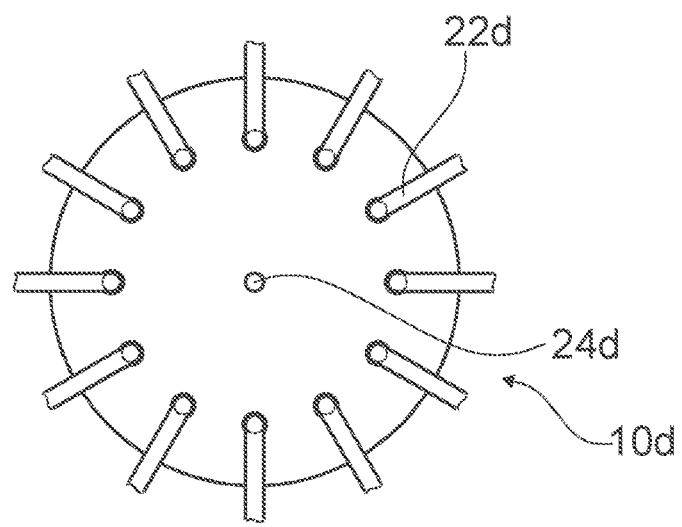
Figure 10:
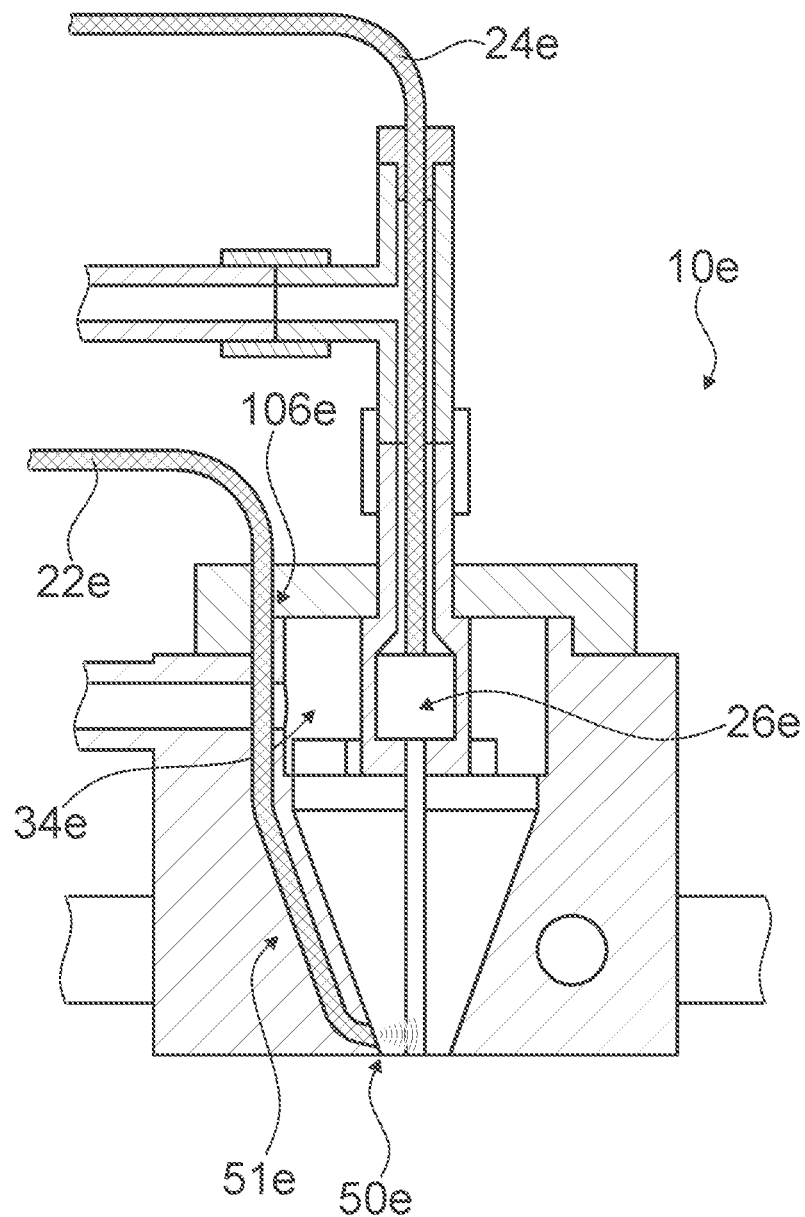
Figure 11:
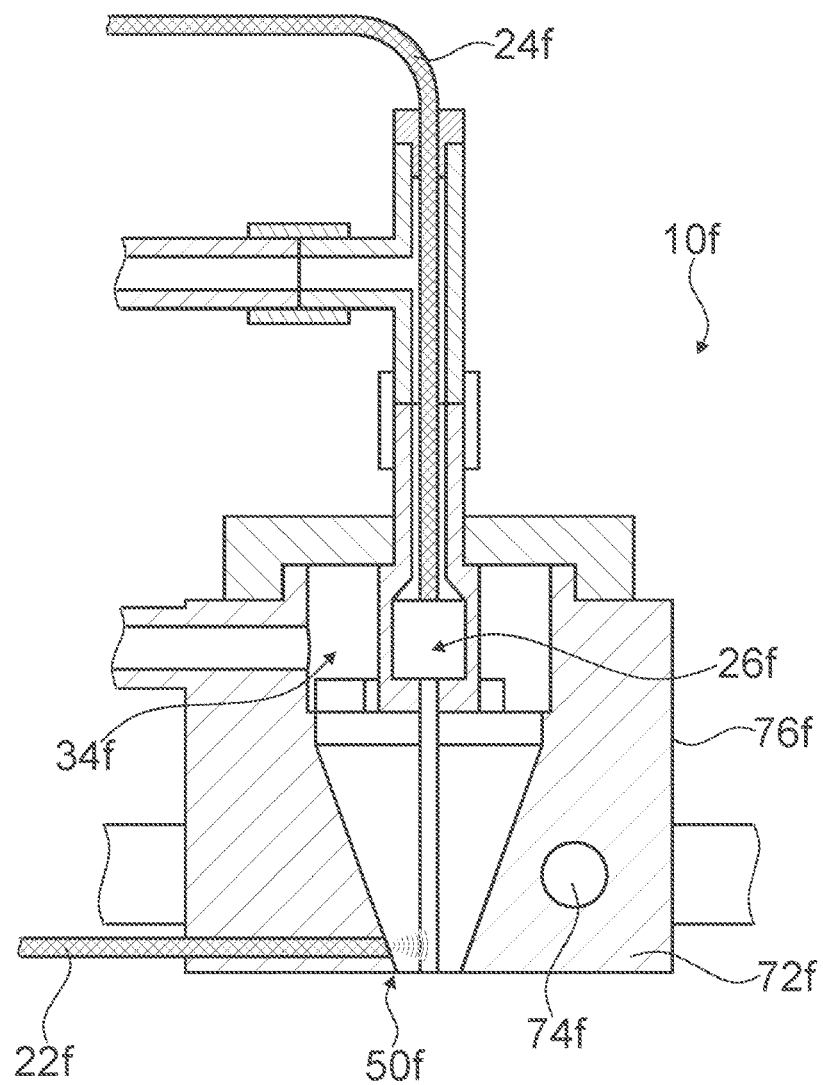
Figure 12:
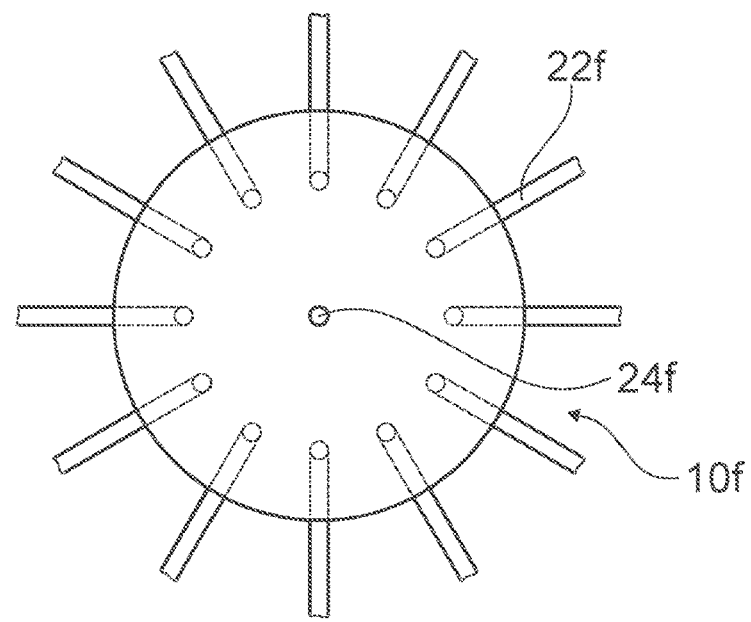

In the drawings:

FIG. 1 shows a system for producing a filament with a filament production device in a schematic side view, FIG. 2 shows part of the filament production device in a sectional view, FIG. 3 shows a schematic flow diagram of a method for producing the filament with the filament production device, FIG. 4 shows a further exemplary embodiment of part of a filament production device in a schematic illustration, FIG. 5 shows part of the filament production device from FIG. 4 in a sectional view, FIG. 6 shows an alternative exemplary embodiment of part of a filament production device in a schematic illustration, FIG. 7 shows part of the filament production device from FIG. 6 in a sectional view, FIG. 8 shows a further exemplary embodiment of part of a filament production device in a sectional view, FIG. 9 shows part of the filament production device from FIG. 8 in a plan view, FIG. 10 shows a further exemplary embodiment of part of a filament production device in a sectional view, FIG. 11 shows a further exemplary embodiment of part of a filament production device in a sectional view, and FIG. 12 shows part of the filament production device from FIG. 11 in a plan view.

DETAILED DESCRIPTION OF THE INVENTION

FIG. 1 shows a schematic structure of a system 48a for producing a filament 16a with a filament production device formed as a filament reaction-spinning production device. The filament production device produces the filament 16a in an operating state in series production. The filament production device forms the filament 16a in an operating state as a hollow fibre membrane.

The filament production device has a spinning nozzle unit 10a (see FIG. 2). The spinning nozzle unit 10a produces the filament 16*a* continuously in an operating state. The spinning nozzle unit 10*a* produces the filament 16*a* from a polymer solution 12*a* in an operating state. In the present case, the spinning nozzle unit 10*a* additionally produces the filament 16*a* by means of an inner fluid 30*a* in an operating state. However, it is also conceivable that the spinning nozzle unit 10*a* can produce the filament 16*a* from at least one further polymer solution and/or at least one further inner fluid.

The polymer solution 12*a* comprises at least one polymer. The polymer, in an operating state, forms the filament 16*a*. The polymer is polyethersulfone (PES). The polymer solution 12*a* can alternatively or additionally comprise, as polymer, polysulfone (PSU), polyethersulfone (PES), polyvinylidene fluoride (PVDF), poly(arylene sulfone) (PAS) and/or poly(aryl ether sulfone) (PAES). The polymer solution 12*a* also comprises at least one further polymer. The further polymer is a pore generator. The further polymer, in an operating state, forms pores within the filament 16*a*. The further polymer functionalises the filament 16*a* hydrophilically by polymerisation in an operating state. In the present case, the further polymer is polyvinylpyrrolidone (PVP). However, it is also conceivable that the further polymer is another pore generator appearing advantageous to a person skilled in the art. In addition, the polymer solution 12*a* comprises a solvent. The solvent is a solvent for at least one of the polymers. In the present case, the solvent is a solvent for the polymer and the further polymer. It is also conceivable that the polymer solution 12*a* can comprise further chemical components, such as non-solvents, monomers, copolymers, pre-polymers, fillers, pigments, flame retardants and/or polymerisation initiators.

The inner fluid 30*a* comprises at least one non-solvent. The non-solvent is a non-solvent for at least one of the polymers contained in the polymer solution 12*a*. It is also conceivable that the inner fluid 30*a* can comprise further chemical components, such as solvents, monomers, copolymers, pre-polymers, fillers, pigments, flame retardants, pore generators and/or polymerisation initiators.

The spinning nozzle unit 10*a* has at least one spinning nozzle 50*a*. The spinning nozzle 50*a* spins the polymer solution 12*a* in an operating state. The spinning nozzle unit 10*a* has a polymer solution channel 34*a*. The polymer solution channel 34*a* guides the polymer solution 12*a* in an operating state. The spinning nozzle unit 10*a* also has an inner fluid channel 26*a*. The inner fluid channel 26*a* guides the inner fluid 30*a* in an operating state. The polymer solution channel 34*a* surrounds the inner fluid channel 26*a* at least partially in one cross-section. The polymer solution channel 34*a* surrounds the inner fluid channel 26*a* at least partially in the peripheral direction. The polymer solution channel 34*a* forms the spinning nozzle 50*a* at least partially. The inner fluid channel 26*a* forms the spinning nozzle 50*a* at least partially. Additionally or alternatively, the spinning nozzle unit 10*a* can have at least one further polymer solution channel and/or at least one further inner fluid channel, which are formed in a manner at least substantially equivalent to the polymer solution channel and/or the inner fluid channel. The polymer solution channels and/or the inner fluid channels can then be arranged in different combinations with one another. It is conceivable that the polymer solution channels and the inner fluid channels surround one another at least partially in at least one cross-section, in particular in the peripheral direction. In particular, the polymer solution channels and/or the inner fluid channels can be provided advantageously for guiding the same polymer solution and/or the same inner fluid. Alternatively or additionally, the polymer solution channels can be provided advantageously for guiding different polymer solutions, and/or the inner fluid channels advantageously can be provided for guiding different inner fluids.

The filament production device has a polymerisation unit 18*a*. The polymerisation unit 18*a* is formed at least partially integrally with the spinning nozzle unit 10*a*. The polymerisation unit 18*a* is integrated at least partially in the spinning nozzle unit 10*a*. The polymerisation unit 18*a* in the operating state initiates the polymerisation of the polymer solution 12*a* within the spinning nozzle unit 10*a*.

The feed unit 38*a* has a polymer solution feed line 54*a*. The polymer solution feed line 54*a* is connected to the polymer solution channel 34*a* of the spinning nozzle unit 10*a*. The feed unit 38*a* also has an inner fluid feed line 56*a*. The inner fluid feed line 56*a* is connected to the inner fluid channel 26*a* of the spinning nozzle unit 10*a*.

In an operating state, the feed unit 38*a* feeds the polymerisation initiator to the polymer solution channel 34*a*. The feed unit 38*a* has a polymerisation initiator feed line 58*a* for the polymerisation initiator. The polymerisation initiator feed line 58*a* is connected to the polymer solution channel 34*a* of the spinning nozzle unit 10*a*. The polymerisation initiator is fed to the polymer solution 12*a*. Once the polymerisation initiator has been fed to the polymer solution 12*a*, the polymerisation initiator is part of the polymer solution 12*a*. The feed unit 38*a* has a mixer 60*a*. The mixer 60*a* in an operating state mixes the polymer solution 12*a* and the polymerisation initiator. The polymer solution feed line 54*a* is connected to the mixer 60*a*. The polymerisation initiator feed line 58*a* is connected to the mixer 60*a*. The mixer 60*a* is connected to the polymer solution channel 34*a* of the spinning nozzle unit 10*a*. The mixer 60*a* is formed as a static mixer. In order to achieve a particularly compact embodiment, the mixer 60*a* could also be integrated in the spinning nozzle unit 10*a*. In particular, the polymer solution channel 34*a* of the spinning nozzle unit 10*a* could form the mixer 60*a* at least in part. In the present case, the polymerisation initiator feed line 58*a* is connected indirectly to the polymer solution channel 34*a*. Alternatively, the polymerisation initiator feed line 58*a* can be directly connected to the polymer solution channel 34*a*.

In an operating state, the feed unit 38*a* also feeds the polymerisation initiator to the inner fluid channel 26*a*. Once the polymerisation initiator has been fed to the inner fluid 30*a*, the polymerisation initiator is part of the inner fluid 30*a*. The feed unit 38*a* has a further polymerisation initiator feed line 64*a* for the polymerisation initiator. The further polymerisation initiator feed line 64*a* is connected to the inner fluid channel 26*a* of the spinning nozzle unit 10*a*. The polymerisation initiator is fed to the inner fluid 30*a*. The feed unit 38*a* has a further mixer 64*a*. The further mixer 64*a* mixes the inner fluid 30*a* and the polymerisation initiator in an operating state. The inner fluid feed line 56*a* is connected to the further mixer 64*a*. The further polymerisation initiator feed line 62*a* is connected to the further mixer 64*a*. The further mixer 64*a* is connected to the inner fluid channel 26*a* of the spinning nozzle unit 10*a*. The further mixer 64*a* is formed as a static mixer. In order to achieve a particularly compact embodiment, the mixer 64*a* could also be integrated in the spinning nozzle unit 10*a*. In particular, the inner fluid channel 26*a* of the spinning nozzle unit 10*a* could form the mixer 64*a* at least in part. In the present case, the further polymerisation initiator feed line 62*a* is indirectly connected to the inner fluid channel 26*a*. Alternatively, the polymerisation initiator feed line 58*a* can be directly connected to the inner fluid channel 26*a*. It is conceivable in particular that at least one of the mixers 60a, 64a, in particular the further mixer 64a, can be dispensed with.

It is conceivable that the feed unit 38a is provided for feeding the polymerisation initiator only to the polymer solution channel 34a. Alternatively, however, it is also conceivable that the feed unit 38a is provided for feeding the polymerisation initiator only to the inner fluid channel 26a. It is also conceivable that the feed unit 38a feeds different polymerisation initiators to the polymer solution channel 34a and the inner fluid channel 26a.

In order to feed the polymer solution 12a, the inner fluid 30a and/or the polymerisation initiator, the feed unit 38a also has at least one pump, in particular one pump for each substance to be fed. The feed unit 38a can also have at least one filter. The filter in an operating state filters out undissolved constituents of the polymer solution and/or the inner fluid.

The polymerisation initiator is a photoinitiator in the present case. The photoinitiator is 4,4,'-diazidostilbene 2,2'-disodium sulfonate. However, it is also conceivable that the polymerisation initiator is formed as a radical starter. The radical starter for example can be peroxide, tert-butyl peroxypivalate and/or H2O2/CuCl2.

The polymerisation unit 18a comprises at least one irradiation unit 20a. The irradiation unit 20a in at least one operating state applies electromagnetic radiation to the polymer solution 12a, in particular the polymerisation initiator contained in the polymer solution 12a, in order to initiate the polymerisation. The irradiation unit 20a also applies electromagnetic radiation in an operating state to the inner fluid 30a, in particular the polymerisation initiator preferably contained in the inner fluid 30a, in order to initiate the polymerisation. Alternatively, the irradiation unit 12a can be provided for applying electromagnetic radiation only to the polymer solution 12a or the inner fluid 30a. The irradiation unit 20a applies electromagnetic radiation to the polymer solution 12a and/or the inner fluid 30a once these have been mixed with the polymerisation initiator.

The irradiation unit 20a has at least one radiation source 66a, 68a. In the present case, the irradiation unit 20a has a radiation source 66a, 68a for each channel 26a, 34a of the spinning nozzle unit 10a. The irradiation unit 20a has a radiation source 66a for the inner fluid channel 26a. The irradiation unit 20a has a radiation source 68a for the polymer solution channel 34a. The radiation sources 66a, 68a are formed at least in a manner substantially equivalent to one another. Thus, only one radiation source 66a will be described hereinafter. The following description can also be transferred in principle to the radiation source 68a. However, it is also conceivable that the radiation sources 66a, 68a are formed differently from one another and for example differ in terms of a radiation spectrum of the electromagnetic radiation.

The radiation source 66a is formed as a laser diode. However, it is also conceivable that the radiation source 66a can be formed as a gas discharge lamp, in particular a halogen metal vapour lamp, preferably a mercury vapour lamp, as a laser and/or as a light-emitting diode. The radiation source 66a in an operating state generates the electromagnetic radiation. The electromagnetic radiation has a radiation spectrum with an intensity maximum in the range of ultraviolet radiation. The intensity maximum of the radiation spectrum of the electromagnetic radiation is selected such that it at least partially coincides with an absorption spectrum of the polymerisation initiator. In the present case, the electromagnetic radiation has a radiation spectrum with an intensity maximum in the range of near UV radiation. However, it is also conceivable that the electromagnetic radiation has a radiation spectrum with an intensity maximum in the range of near UV radiation (UV-A), middle UV radiation (UV-B), far UV radiation (UV-C-FUV), vacuum UV radiation (UV-C-VUV) and/or extreme UV radiation (EUV). The intensity maximum of the radiation spectrum of the electromagnetic radiation has an energy of at least 3.2 eV. The intensity maximum of the radiation spectrum of the electromagnetic radiation has an energy of at most 3.94 eV. The intensity maximum of the radiation spectrum of the electromagnetic radiation also has a wavelength of at most 390 nm. The intensity maximum of the radiation spectrum of the electromagnetic radiation also has a wavelength of at least 350 nm. A power density of the electromagnetic radiation is selected such that this is at least sufficient for activation of the polymerisation initiator. The electromagnetic radiation has a power density of at least 0.2 mW/cm$^2$ at the position at which the electromagnetic radiation is coupled into the spinning nozzle unit 10a. The electromagnetic radiation has a power density of at most 0.5 mW/cm$^2$ at the position at which the electromagnetic radiation is coupled into the spinning nozzle unit 10a.

The irradiation unit 20a can have further optical components, in particular for varying a property of the electromagnetic radiation. The property of the electromagnetic radiation is varied over time. The property of the electromagnetic radiation to be varied is for example an intensity maximum of the radiation spectrum. In order to vary the intensity maximum of the radiation spectrum, the irradiation unit 20a in the present case has a shutter, an attenuator and/or an optical filter (not shown). The optical filter for example can be formed here as a high-pass filter, low-pass filter and/or bandpass filter. Furthermore, further properties of the electromagnetic radiation, such as a power density, can also be varied by means of further optical elements. The irradiation unit 20a can comprise further optical elements, such as optical modulators, lenses, beam splitters and/or mirrors.

It is conceivable that the spinning nozzle unit 10a for applying electromagnetic radiation at least to the polymer solution 12a and/or the inner fluid 30a can be at least partially transmissive for the electromagnetic radiation. For example, the spinning nozzle unit 10a could have at least partially transparent components and/or openings. In the present case, the irradiation unit 20a comprises at least one radiation-guiding element 22a, 24a for coupling the electromagnetic radiation into the spinning nozzle unit 10a. The irradiation unit 20a couples the electromagnetic radiation into at least one channel 26a, 34a of the spinning nozzle unit 10a in an operating state. The irradiation unit 20a has a radiation-guiding element 22a, 24a for each channel 26a, 34a. The irradiation unit 20a couples the electromagnetic radiation at least partially into the polymer solution channel 34a in at least one operating state. In the present case, the irradiation unit 20a comprises a radiation-guiding element 22a for coupling the electromagnetic radiation into the polymer solution channel 34a. The irradiation unit 20a couples the electromagnetic radiation at least partially into the inner fluid channel 26a in at least one operating state. Furthermore, the irradiation unit 20a has a radiation-guiding element 24a for coupling the electromagnetic radiation into the inner fluid channel 26a. The radiation-guiding element 22a is optically connected to the radiation source 68a. The radiation-guiding element 24a is optically connected to the radiation source 66a. Alternatively or additionally, the irradiation unit 20a can couple the electromagnetic radiation at least partially into at least one further polymer solution channel and/or the inner fluid channel in at least one operating state.

The radiation-guiding elements 22a, 24a are formed in a manner at least substantially equivalent to one another. Thus, only one radiation-guiding element 22a will be described hereinafter. The following description can also be transferred in principle to the radiation-guiding element 24a. However, it is also conceivable that the radiation-guiding elements 22a, 24a are formed differently from one another.

The radiation-guiding element 22a transmits the electromagnetic radiation optically in an operating state. The radiation-guiding element 22a transmits the electromagnetic radiation from the radiation source 68a to the spinning nozzle unit 10a. The radiation-guiding element 22a, 24a couples the electromagnetic radiation into the spinning nozzle unit 10a in an operating state. The radiation-guiding element 22a, 24a is formed as an optical fibre. The radiation-guiding element 22a, 24a is arranged in the spinning nozzle unit 10a. The radiation-guiding element 22a, 24a is connected to the spinning nozzle unit 10a such that it can be detached without destruction. The radiation-guiding element 22a is connected to the spinning nozzle unit 10a such that it can be detached without tools. However, it is also conceivable that the radiation-guiding element 22a, 24a is flange-mounted on the spinning nozzle unit 10a and/or is adhesively bonded thereto.

The refractive index of the radiation-guiding element 22a can be substantially identical to the refractive index of the polymer solution 12a flowing through the polymer solution channel 34a. Furthermore, the refractive index of the radiation-guiding element 24a can also be substantially identical to the refractive index of the inner fluid 30a flowing through the inner fluid channel 26a.

The radiation-guiding element 22a can have a concave and preferably convex tip, in order to advantageously further improve the coupling-in. Alternatively or additionally, an optical unit of the filament production device arranged downstream of the radiation-guiding element 22a can also be conceivable for coupling in the electromagnetic radiation.

The radiation-guiding element 24a can also have a concave and preferably convex tip in order to advantageously further improve the coupling-in. Alternatively or additionally, an optical unit of the filament production device arranged downstream of the radiation-guiding element 24a can also be conceivable for coupling in the electromagnetic radiation.

In order to improve in particular the guidance of the electromagnetic radiation within the inner fluid 30a, an inner fluid 30a which has a refractive index greater, preferably significantly greater, than the refractive index of the polymer solution 12a can be used. The inner fluid 30a and the polymer solution 12a form a liquid radiation-guiding element 110a. Alternatively, a polymer solution 12a which has a refractive index greater, preferably significantly greater, than the refractive index of the inner fluid 30a, and in particular the refractive index of a surrounding environment, can be used to improve the guidance of the radiation within the polymer solution 12a.

The polymerisation unit 18a also has a temperature-control unit 44a. The temperature-control unit 44a applies heat energy at least to the polymer solution 12a in at least one operating state in order to initiate the polymerisation. It is conceivable that the irradiation unit 20a and/or the temperature-control unit 44a can initiate the polymerisation jointly or independently of one another. The temperature-control unit 44a in at least one operating state applies heat energy at least to the inner fluid solution 30a. Alternatively or additionally, the temperature-control unit can apply heat energy to the further polymer solution and/or the further inner fluid in order to initiate the polymerisation. The heat energy is selected such that it is sufficient at least for activation of the polymerisation initiator. The heat energy corresponds to the decomposition temperature of the polymerisation initiator.

The temperature-control unit 44a has a heat energy source 70a. The temperature-control unit 44a also has a temperature-control element 72a. The temperature-control element 72a absorbs heat energy and/or releases heat energy. The temperature-control element 72a is formed as a radiator. The temperature-control element 72a is connected to the heat energy source 70a for exchange of heat energy. In the present case, the temperature-control element 72a is connected to the heat energy source 70a by means of a heat transport element 74a. The heat transport element 74a absorbs heat energy from the heat energy source 70a and releases it to the temperature-control element 72a. The temperature-control element 72a is formed integrally with a main body 78a of the spinning nozzle unit 10a. The temperature-control element 72a is formed as a radiator. The temperature-control unit can be formed in particular as a thermocryostat.

The filament production device has a control unit 46a. The control unit 46a controls the polymerisation unit 18a in at least one operating state for selective initiation of the polymerisation. The control unit 46a is connected to the spinning nozzle unit. The control unit 46a is connected to the polymerisation unit 18a. The control unit 46a is connected to the irradiation unit 20a. The control unit is connected to the feed unit 38a. The control unit 46a is connected to the temperature-control unit 44a. The control unit 46a is formed as an electronic unit. The control unit 46a controls at least one operating parameter of the polymerisation unit 18a in an operating state by means of open-loop and/or closed-loop control. The control unit 46a comprises a computing unit (not shown). The control unit 46a has a memory unit (not shown). The control unit 46a has an open-loop and/or closed-loop control program. The open-loop and/or closed-loop control program is stored on the memory unit. The open-loop and/or closed-loop program is executed by the computing unit in at least one operating state. In the present case, the control unit 46a in an operating state varies the intensity of the electromagnetic radiation as operating parameter. The control unit 46a in an operating state also varies the course over time of the operating parameter. The control unit 46a also varies the heat energy of the temperature-control unit 44a as operating parameter. The control unit 46a also varies a flow rate of the polymer solution and/or of the inner fluid through the spinning nozzle unit 10a and/or a substance amount ratio, in particular of the polymer of the polymer solution and of the polymerisation initiator as operating parameter.

FIG. 3 shows a schematic flow diagram of a method for producing the filament 16a with the filament production device.

In a method step 80a, the polymer solution 12a is produced. In addition, a further polymer solution could be produced in this method step. The polymer solution 12a is received by the feed unit 38a. The polymer solution feed line 54a of the feed unit 38a receives the polymer solution 12a. It is conceivable in particular that the polymer solutions are different polymer solutions.

In a method step 82a, the inner fluid 30a is produced. The inner fluid 30a is received by the feed unit 38a. The inner fluid feed line 56a of the feed unit 38a receives the inner fluid. In addition, a further inner fluid could additionally be produced in this method step. It is in particular conceivable that the inner fluids are different inner fluids.

In a method step 84a, the polymer solution 12a is filtered. The feed unit 38a has a filter for this purpose.

In a method step 86a, a polymerisation initiator is received by the feed unit 38a. To this end, the feed unit 38a has the polymerisation initiator feed line 58a. The feed unit to this end also has the further polymerisation feed line 62a. The polymer solution 12 is mixed with the polymerisation initiator. The inner fluid 30a is mixed with the polymerisation initiator. Alternatively, only the polymer solution or only the inner fluid can also be mixed with the polymerisation initiator. After the mixing, the polymerisation initiator is part of the polymer solution 12a and/or the inner fluid 30a. The polymer solution 12a, which comprises the polymerisation initiator, and/or the inner fluid 30a, which comprises the polymerisation initiator, are/is also fed to the spinning nozzle unit 10a.

In a method step 88a, at least the filament 16a is produced by means of the spinning nozzle unit 10a from the polymer solution 12a and/or by means of the inner fluid 30a, wherein polymerisation is initiated at least partially within the spinning nozzle unit 10a.

In a method step 90a, the filament 16a is precipitated in a precipitation bath.

In a method step 92a, the filament 16a is precipitated in a further precipitation bath. The precipitation bath and the further precipitation bath have different precipitation bath temperatures.

In a method step 94a, the filament 16a is wound onto a reel. The filament is advantageously wound here at a speed of at least 2 rpm and/or at most 7 rpm.

In a method step 96a, the filament 16a is introduced into a washing tank. The filament 16a is flushed in the washing tank. Residues of the polymer solution 12a and of the inner fluid 30a are hereby detached from the filament 16a.

In a method step 98a, the filament is introduced into a conditioning tank. A conditioning of the filament 16a is performed. The conditioning is performed by means of hypochlorite. Non-polymerised fractions of the polymer solution 12a are hereby separated from the filament 16a.

In a method step 100a, the filament 16a is rinsed.

In a method step 102a, the filament 16a is subjected to glycerolysis. The filament 16a is brought into contact with glycerol. The flexibility and/or pliability of the filament 16a are/is improved hereby.

In a method step 104a, the filament 16a is dried.

FIGS. 4 to 11 show further exemplary embodiments of the invention. The following descriptions and the drawings are limited fundamentally to the differences between the exemplary embodiments, wherein reference can be made also to the drawings and/or the description of the other exemplary embodiments, in particular of FIGS. 1 to 3, in respect of components having the same name, in particular in respect of components having like reference signs. In order to distinguish between the exemplary embodiments, the letter a has been placed after the reference signs for the exemplary embodiment in FIGS. 1 to 3. The letter a is replaced by the letters b to fin the further exemplary embodiments of FIGS. 4 to 11.

FIGS. 4 and 5 show a further exemplary embodiment of the filament production device in a schematic illustration and once in a sectional view. This exemplary embodiment differs here at least fundamentally from the previous exemplary embodiment in that a polymerisation feed line 62b is directly connected to the inner fluid channel 26b. The further mixer 64b can be formed here by the inner fluid channel. Alternatively, however, the further mixer 64b can also be spared. The irradiation unit 20b also has just one radiation source 66b. The irradiation unit 20b has just one light guide element 24b. In the present case, the inner fluid 26 and in particular the polymerisation initiator, which is part of the inner fluid 30b, is exposed to electromagnetic radiation. The electromagnetic radiation is coupled into the inner fluid channel 30b.

FIGS. 6 and 7 show an alternative exemplary embodiment of the filament production device in a schematic illustration and once in a sectional view. This exemplary embodiment differs here at least fundamentally from the previous exemplary embodiment in that the spinning nozzle unit has a further polymer solution channel 36c. The further polymer solution channel 36c guides a further polymer solution 14c in an operating state. The further polymer solution channel 36c surrounds a polymer solution channel 34c. The polymer solution channel 34c and the further polymer solution channel 36c are provided for guiding different polymer solutions 12c, 14c. The polymer solution 12c and the further polymer solution 14c differ from one another at least by a polymer. The polymer solution 12c comprises polyethersulfone (PES), whereas the further polymer solution 14c is free from polyethersulfone (PES). The further polymer solution 14c also comprises polyvinylidene fluoride (PVDF), whereas the polymer solution 12c is free from polyvinylidene fluoride (PVDF). A feed unit 38b also has a further polymer solution feed line 55c. The feed unit 38c also has an additional polymerisation initiator feed line 59c. The feed unit 38c has an additional mixer 61c. An irradiation unit 20c has an additional radiation source 69c. The irradiation unit 20c also has an additional radiation-guiding element 25c in order to couple the electromagnetic radiation into a spinning nozzle unit 10c. The irradiation unit 20c couples the electromagnetic radiation into at least the further polymerisation channel 36c in an operating state.

FIGS. 8 and 9 show part of an alternative exemplary embodiment of a filament production device in a sectional view and in a plan view. The filament production device comprises a spinning nozzle unit 10d. The filament production device also comprises an irradiation unit 20d. The irradiation unit 20d comprises at least one radiation-guiding element 22d, 24d in order to couple electromagnetic radiation into the spinning nozzle unit 10d. The irradiation unit 20d couples the electromagnetic radiation at least partially into an inner fluid channel 26d of the spinning nozzle unit 10d in at least one operating state. The irradiation unit 20d couples the electromagnetic radiation at least partially into a polymer solution channel 34d of the spinning nozzle unit 10d in at least one operating state.

The spinning nozzle unit 10d has a spinning nozzle 50d. The spinning nozzle 50d has a spinning nozzle wall 51d. The spinning nozzle wall 51d delimits at least one channel of the spinning nozzle unit 10d, in particular the polymer solution channel 34d. The spinning nozzle wall 51d has a receiving channel 106d. The receiving channel 106d is provided for receiving the radiation-guiding element 22d. The spinning nozzle wall 51d has a first portion 52d. The first portion 52d consists of a reflective material, such as metal. The spinning nozzle wall 51d also has a second portion 53d. The second portion 53d consists of a transparent material. The receiving channel 106d is arranged within the second portion 53d. The receiving channel 106d runs at least substantially parallel to the polymer solution channel 34d.

The radiation-guiding element 22d is arranged at least partially within the spinning nozzle wall 51d. The radiation-guiding element 22d is arranged at least partially in the receiving channel 106d. In the present case the radiation-guiding element 22d runs at least substantially parallel to the polymer solution channel 34d. The radiation-guiding element 22d is arranged in the second portion 53d. The radiation-guiding element 22d couples electromagnetic radiation into the second portion 53d. The electromagnetic radiation is reflected at an interface 108d between the first portion 52d and the second portion 53d in the direction of the polymer solution channel 34d and in particular is coupled thereinto.

Alternatively, the reflection at the interface 108d can be achieved by total reflection, for example if the refractive index of the first portion 52d is lower than the refractive index of the second portion 53d.

In the present case, the filament production device has a plurality of radiation-guiding elements 22d. For improved clarity, only one radiation-guiding element 22d has been provided with a reference sign. The radiation-guiding elements 22d are identical to one another. The radiation-guiding elements 22d are arranged rotationally symmetrically about the polymer solution channel 34d. The radiation-guiding elements 22d are arranged in an annular manner (see FIG. 9).

Electromagnetic radiation could also be coupled into the inner fluid channel 26d in an equivalent manner by the radiation-guiding element 24d.

FIG. 10 shows part of an alternative exemplary embodiment of a filament production device in a sectional view. The filament production device comprises a spinning nozzle unit 10e. The filament production device also comprises an irradiation unit 10e. The irradiation unit 20e comprises at least one radiation-guiding element 22e, 24e in order to couple electromagnetic radiation into the spinning nozzle unit 10e. The irradiation unit 20e couples the electromagnetic radiation at least partially into an inner fluid channel 26e of the spinning nozzle unit 10e in at least one operating state. The irradiation unit 20e couples the electromagnetic radiation at least partially into a polymer solution channel 34e of the spinning nozzle unit 10e in at least one operating state.

The spinning nozzle unit 10e has a spinning nozzle 50e. The spinning nozzle 50e has a spinning nozzle wall 51e. The spinning nozzle wall 51e delimits at least one channel of the spinning nozzle unit 10e, in particular the polymer solution channel 34e. The spinning nozzle wall 51e has a receiving channel 106e. The receiving channel 106e is provided for receiving the radiation-guiding element 22e. The receiving channel 106e runs at least substantially parallel to the polymer solution channel 34e. The receiving channel 106e is curved in the direction of the polymer solution channel 34e. The receiving channel 106e has an opening in the direction of the polymer solution channel 34e.

The radiation-guiding element 22e is arranged at least partially within the spinning nozzle wall 51e. The radiation-guiding element 22e is arranged at least partially in the receiving channel 106e. In the present case the radiation-guiding element 22e runs at least substantially parallel to the polymer solution channel 34e. One end of the radiation-guiding element 22e is arranged in the opening of the receiving channel 106e in order to couple the electromagnetic radiation into the polymer solution channel 34e.

In the present case the filament production device has a plurality of radiation-guiding elements 22e. For improved clarity, just one radiation-guiding element 22e has been provided with a reference sign. The radiation-guiding elements 22e are identical to one another. The radiation-guiding elements 22e are arranged rotationally symmetrically about the polymer solution channel 34e. The radiation elements 22e are arranged in an annular manner (see FIG. 9).

Electromagnetic radiation could also be coupled into the inner fluid channel 26e in an equivalent manner by the radiation-guiding element 24e.

FIGS. 11 and 12 show part of an alternative filament production device in a sectional view and in a plan view. The filament production device comprises a spinning nozzle unit 10f. The filament production device also comprises an irradiation unit 20f. The irradiation unit 20f comprises at least one radiation-guiding element 22f, 24f in order to couple electromagnetic radiation into the spinning nozzle unit 10f. The irradiation unit 20f couples the electromagnetic radiation at least partially into an inner fluid channel 26f of the spinning nozzle unit 10f in at least one operating state. The irradiation unit 20f couples the electromagnetic radiation at least partially into a polymer solution channel 34f of the spinning nozzle unit 10f in at least one operating state.

The spinning nozzle unit 10f has a spinning nozzle 50f. The spinning nozzle 50f has a spinning nozzle wall 51f. The spinning nozzle wall 51f delimits at least one channel of the spinning nozzle unit 10f, in particular the polymer solution channel 34f. The spinning nozzle wall 51f has a receiving channel 106f. The receiving channel 106f is provided for receiving the radiation-guiding element 22f. The receiving channel 106f runs at least substantially perpendicularly to the polymer solution channel 34f. The receiving channel 106f has an opening in the direction of the polymer solution channel 34f.

The radiation-guiding element 22f is arranged at least partially within the spinning nozzle wall 51f. The radiation-guiding element 22f is arranged at least partially in the receiving channel 106f. In the present case the radiation-guiding element 22f runs at least substantially perpendicularly to the polymer solution channel 34f. One end of the radiation-guiding element 22f is arranged in the opening of the receiving channel 106f for coupling the electromagnetic radiation into the polymer solution channel 34f.

In the present case, the filament production device has a plurality of radiation-guiding elements 22f. For improved clarity, just one radiation-guiding element 22f has been provided with a reference sign. The radiation-guiding elements 22f are identical to one another. The radiation-guiding elements 22f are arranged rotationally symmetrically about the polymer solution channel 34f. The radiation-guiding elements 22f are arranged in an annular manner (see FIG. 9).

Electromagnetic radiation could also be coupled into the inner fluid channel 26f in an equivalent manner by the radiation-guiding element 24f.

The invention claimed is:

1. A filament production device, comprising at least one spinning nozzle unit, which is provided for producing at least one filament, which is formed as a hollow fibre membrane, from at least one polymer solution, and comprising a polymerisation unit, which is provided for initiating a polymerisation of the at least one polymer solution at least partially within the spinning nozzle unit; wherein the spinning nozzle unit has at least one inner fluid channel, which is provided for guiding an inner fluid, and has at least one polymer solution channel, which is provided for guiding the at least one polymer solution, wherein the polymer solution channel surrounds the at least one inner fluid channel at least partially in at least one cross-section; and wherein the polymerization unit comprises at least one irradiation unit for applying electromagnetic radiation only to the inner fluid in the at least one inner fluid channel, wherein the at least one irradiation unit comprises a radiation-guiding element extending at least partially into the at least one inner fluid channel for coupling the electromagnetic radiation only into the at least one inner fluid channel.

2. The filament production device according to claim 1, wherein the spinning nozzle unit has at least one further polymer solution channel, wherein the polymer solution channel and the at least one further polymer solution channel are provided for guiding different polymer solutions.

3. The filament production device according to claim 1, wherein the spinning nozzle unit comprises at least one channel, and the polymerisation unit comprises at least one feed unit, which is provided for feeding a polymerisation initiator to the at least one channel of the spinning nozzle unit.

4. The filament production device according to claim 1, wherein the polymerisation unit has a temperature-control unit, which is provided for applying heat energy at least to the at least one polymer solution for initiating polymerisation.

5. The filament production device according to claim 1, wherein a control unit, which is provided for controlling the polymerisation unit for selective initiation of the polymerisation.

6. The filament production device of claim 1, comprising a filament reaction-spinning production device.

7. A filament production method, with a filament production device having at least one spinning nozzle unit, wherein the spinning nozzle unit has at least one inner fluid channel, which is provided for guiding an inner fluid, and has at least one polymer solution channel, which is provided for guiding at least one polymer solution, wherein the polymer solution channel surrounds the at least one inner fluid channel at least partially in at least one cross-section, wherein at least one filament, which is formed as a hollow fibre membrane, is produced by the spinning nozzle unit from the at least one polymer solution, the method comprising at least partially initiating polymerization within the spinning nozzle unit by applying electromagnetic radiation along a radiation guiding element extending at least partially into the at least one inner fluid channel to apply the electromagnetic radiation to only to the inner fluid in the at least one inner fluid channel.

8. The filament production method of claim 7, comprising a reaction-spinning production method.

\* \* \* \* \*